US005986194A

United States Patent [19]

Schwartz et al.

[11] Patent Number: 5,986,194
[45] Date of Patent: Nov. 16, 1999

[54] HANDCHIME INSTRUMENT

[75] Inventors: Gregory L. Schwartz, Spinnerstown; Richard E. Mattern, Souderton; Russell A. Wenner, Perkiomenville, all of Pa.

[73] Assignee: Schulmerich Carillons, Inc., Sellersville, Pa.

[21] Appl. No.: 09/184,664

[22] Filed: Nov. 2, 1998

[51] Int. Cl.[6] .......... G01D 13/08

[52] U.S. Cl. .......... 84/404; 84/402

[58] Field of Search .......... 84/402, 404, 406, 84/408

[56] References Cited

U.S. PATENT DOCUMENTS

| | | | |
|---|---|---|---|
| 692,694 | 2/1902 | Morgan . | |
| 818,874 | 4/1906 | Deagan . | |
| 991,704 | 5/1911 | Deagan . | |
| 2,280,582 | 4/1942 | Hoeflich | 164/18 |
| 3,783,733 | 1/1974 | Zirimis | 84/402 |
| 3,941,082 | 3/1976 | Malta | 116/171 |
| 4,062,317 | 12/1977 | Malta | 116/171 |
| 4,121,534 | 10/1978 | Malta | 116/171 |
| 4,469,003 | 9/1984 | Phelps | 84/404 |
| 4,566,400 | 1/1986 | Keenan et al. | 116/171 |
| 4,599,932 | 7/1986 | Malta | 84/404 |
| 4,976,651 | 12/1990 | Frank | 446/421 |
| 5,207,769 | 5/1993 | Malta | 84/404 |
| 5,235,893 | 8/1993 | Malta | 84/406 |

OTHER PUBLICATIONS

The Physics of Bells, http://www.ling.upenn.edu/~kingsbur/Bells.html, "The Physics of Bells", Jul. 2, 1998, 5 pages.

Acoustical Society of America 133rd Meeting Lay Language Papers, http://www.acoustics.org/133rd/2pmul.1.html, "Acoustics of Eastern and Western Bells, Old and New", Jul. 2, 1998, 3 pages.

*Primary Examiner*—Robert E. Nappi
*Assistant Examiner*—Shih-Yung Hsieh
*Attorney, Agent, or Firm*—Woodcock Washburn Kurtz Mackiewicz & Norris LLP

[57] ABSTRACT

A hand held musical instrument is capable of emitting sound through the combination of three elements: a hollow tube, a striking member, and a hinge to secure the striking member to the tube. The hollow tube is constructed of an ergonomic shape that allows easy and fatigue-free grasping. For low notes, the slots on the resonating end of the hollow tube are multi-sized to eliminate buzzing. The clapper is attached to the hollow tube through a combination of a stainless steel axle, polymer bearings and adjustable tensioning screws. This combination improves the durability of the instrument yet still allows the musician to adjust the strike feel. The invention also provides improvements in the clapper heads for both low note and middle and high note handchimes. For low notes, the clapper head is constructed of multiple layers that optimize sound quality. For middle or high notes, the rubber clapper head provides multiple settings which allows the musician to easily and precisely adjust the timbre setting.

32 Claims, 4 Drawing Sheets

FIG. 3
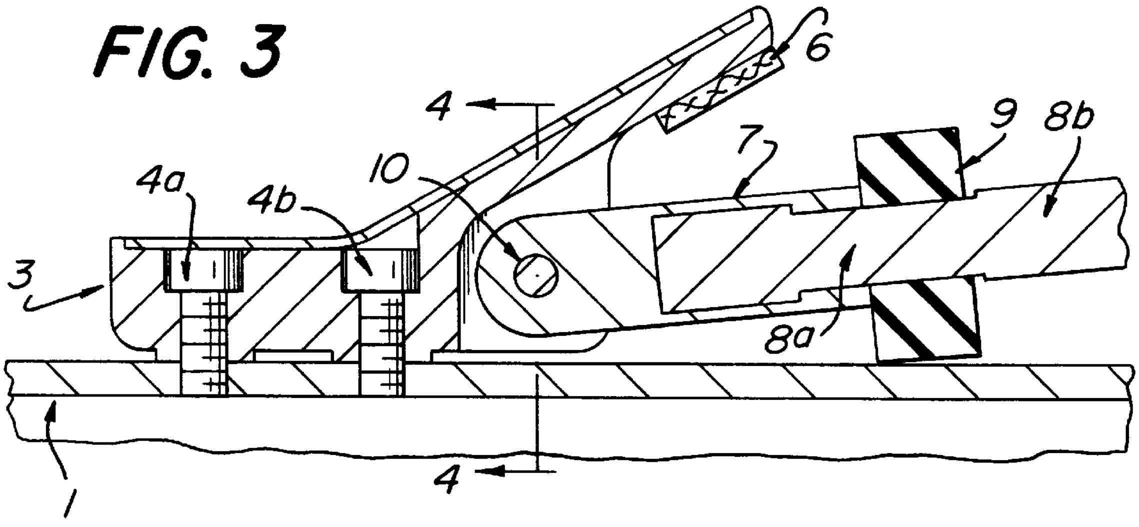
FIG. 4
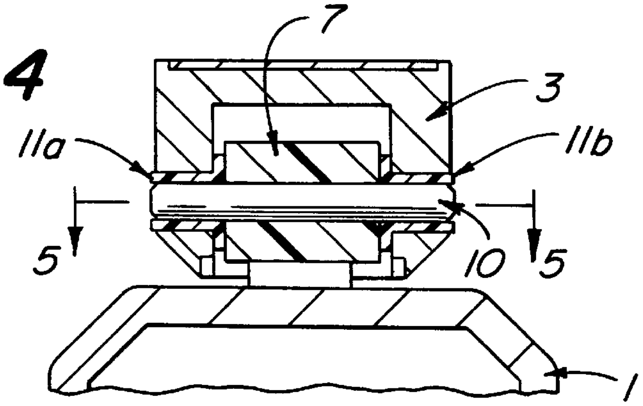
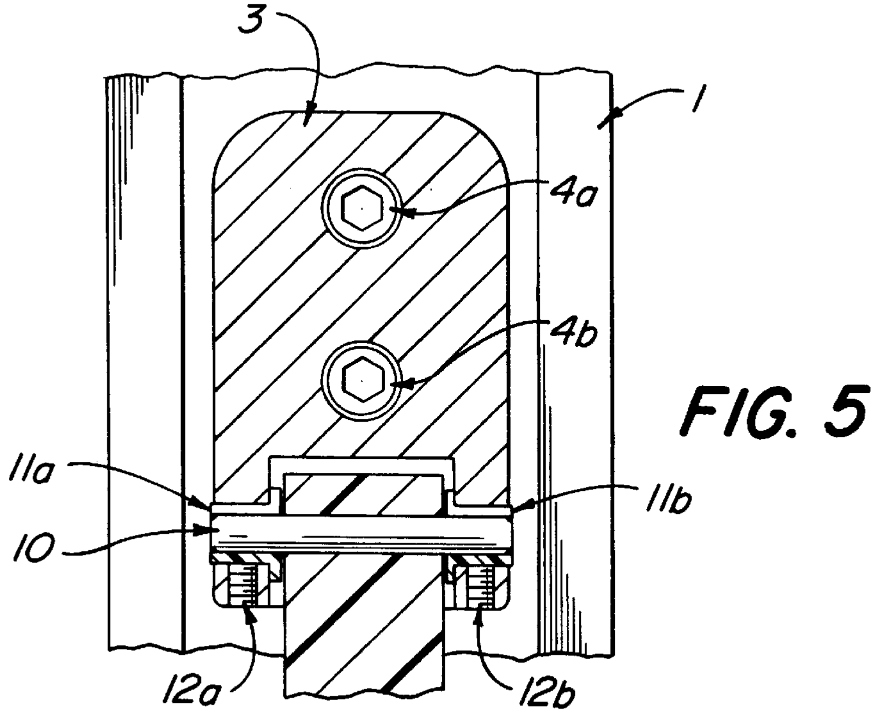
FIG. 5

HANDCHIME INSTRUMENT

FIELD OF THE INVENTION

This invention relates to a hand held, percussion musical instrument that emits sound through striking a clapper onto the slotted end of a hollow aluminum tube. More particularly, the present invention relates to a handchime.

BACKGROUND OF THE INVENTION

The prior art discloses many inventions that cause sound to be emitted by striking a hammer, knocker, clapper, or similar means against a tube, triangle or other object. These devices can be differentiated by, but are not limited to, the sounds that they emit, the striking means itself, the object being struck, the method of attaching the striking means to the device, or the method of playing the device.

Handchimes vibrate in an infinite number of ways, or modes, when struck by a clapper. Only a few of these modes cause the surrounding air to vibrate at a frequency strong enough to be audible to the human ear. The lowest frequency vibration, or the lowest pitch, is called the fundamental. The clapper of a handchime drives the generated frequencies.

Like handbells, handchimes are typically sold in octave or multi-octave sets. A handchime, like a handbell, is individually tuned to emit a particular note. Handbells are tuned by removing metal from their inner diameter. Handchimes are tuned by adjusting the length and/or width of their slots.

The handchimes within an octave set vary in cross sectional area depending upon the note the chime will emit. Larger cross-sectional areas are used for lower octave or lower note handchimes. For example, a three octave or 37 note set of handchimes may utilize three different cross-sectional areas. Therefore, in a typical three octave set, 13 notes, which include C4, C♯4/D♭4, D4, D♯4/E♭4, E4, F4, F♯4/G♭4, G4, G♯4/A♭4, A4, A♯4/B♭4, B4, and C5, are considered lower note or larger cross-section handchimes. The balance of the typical three octave set or the remaining 24 notes, C♯5/D♭5, D5, D♯5/E♭5, E5, F5, F♯5/G♭5, G5, G♯5/A♭5, A5, A♯5/B♭5, B5, C6, C♯6/D♭6, D6, D♯6/E♭6, E6, F6, F♯6/G♭6, G6, G♯6/A♭6, A6, A♯6/B♭6, B6 and C7 are considered smaller cross-section handchimes and emit middle or higher pitched notes. The cross sectional areas of the handchimes will change with respect to each other as a three octave set is expanded to 4, 5 or 6 octaves.

Few of the devices disclosed in the prior art allow control over the musical tones that are produced. Ease of playing or the economical manufacture of the device is at the sacrifice of the overall musical quality of the instrument. Lastly, in the devices disclosed that contain moving parts for the striking means, the moving parts are seldom durable over the life of the product.

One objective of the present invention is to produce a handchime of an ergonomic shape that allows ease of holding and long-term fatigue-free use.

It is an additional objective of the invention to fabricate the support shaft for the striking member of a sufficient weight such that it requires no additional weight to obtain the proper impact force.

It is a further objective of the invention to attach the striking member to the main body of the instrument in a manner that allows the musician to set the strike "feel" to their preference yet still allow long life, durability, and ease of operation.

For middle and higher pitched notes or smaller cross-section handchimes, it is another objective of the invention to design the cross-section of the support shaft to correspond to the various timbre settings of the clapper head for flexible voicing yet still allow for quick and easy adjustments without the benefit of elaborate tools.

For lower note or larger diameter handchimes, it is an objective of the invention to allow proper sound generation without any discordant overtones such as "slapping" or "pinging."

Lastly, for lower note or larger cross-section handchimes, it is a further objective of the invention to eliminate the discordant overtone known as "buzzing" by controlling the width and length of the slot.

SUMMARY OF THE INVENTION

The aforementioned objectives are met by the present invention. Handchimes in accordance with the presently preferred embodiments of the invention are divided into three main elements: the main body or tube, the striking member or clapper, and the method of joining the clapper to the main body. The present invention provides novel features to all three elements. The shape of the main tube offers many advantages. Preferably, the tube is designed to be constructed from octagonal cross-section aluminum tubing. This shape is ideal for use by children or the elderly. The octagonal cross-section is therefore optimal ergonomically. Lastly, to further aid in the comfort of holding and playing, the octagonal tube has a textured powder paint coat for sure gripping and durability.

The main tube is partitioned into two compartments by an internal plug. The plug is preferably constructed of a solid surface and a "waffled" surface on the opposite side. The plug has a waffled or voided side to allow deformation or folding of the plug during installation. A preferred embodiment of this invention has the plug comprised of remanufactured "NYLON" 6/6 which holds the plug firmly in place despite use, storage, handling, and variations in temperature. The position of the plug within the tube is chosen in accordance with the particular note that the chime emits. One end of the tube is used to hold the instrument.

For lower notes, singular-sized slot configurations may encourage the production of a "buzzing" sound due to extraneous resonant frequencies being generated by the combination of the width and length of the slot. The present invention, by contrast, eliminates or discourages "buzzing" by adopting a multi-sized slot configuration. The multi-sized slot "tunes out" the extraneous frequencies and eliminates the "buzzing."

The present invention uses a hinge assembly that incorporates a combination of a stainless steel axle set in a pair of polymer (i.e., "NYLINER") bearings and adjustable via concealed, tensioning screws. The axle and polymer bearings seldom need lubrication. This combination provides accurate, secure alignment of the shaft assembly and eliminates any looseness or "play" in the instrument. The threaded holes for the tensioning screws allow tight-fitting thread engagement so that the use of a thread bonding adhesive, such as "LOC-TITE" adhesive to impede the movement of the threads during normal use, is eliminated. In addition, the tensioning screws allow the musician to adjust the tensioning on the axle and bearings to set the strike "feel" to his or her preference. The musician can simply adjust the tensioning screws to decrease or increase the tension. Less wear is inflicted on the bearings with no loss of durability or longevity of the instrument. Thus, the combination of these features minimizes maintenance and wear of the instrument.

An additional advantage of the present invention is seen in the shaft that supports the clapper head. The clapper support shaft is molded into its yoke rather than pinned in place. The shaft is of sufficient weight to eliminate the need for additional weight at the end of the clapper head to obtain the proper impact force. The shaft length for each note is then individually sized to strike the tube at the optimum strike point.

For middle or high notes or smaller cross-section chimes, the hexagonal cross-section segment of the clapper support shaft also allows for flexible voicing. For these notes, the clapper head has six different timbre settings. The simple assembly of the clapper head to the support shaft allows the musician to reposition the clapper head to a different timbre setting. Because the timbre settings correspond to each side of the hexagonal cross-section of the support shaft, the musician can easily and precisely set the clapper head to a particular timbre setting. Further, the female form of the inner dimension of the clapper head, which is hexagonal shaped to align with the support shaft, allows precision indexing of the timbre setting by eliminating torsional strain or twisting of the clapper head around the support shaft.

The present invention, in its preferred embodiment, incorporates a positioning groove on the clapper support shaft to hold the eccentric rubber bumper relatively fixed in place along the shaft's longitudinal axis. The eccentric rubber bumper is circular in shape with an interior hole that is offset from center. The groove is located on the support shaft at the opposite end of the clapper head. The positioning groove holds the rubber bumper securely in place longitudinally. The convenient location of the eccentric rubber bumper, at the base of the clapper shaft, allows the musician to achieve damping by simply rotating the eccentric rubber bumper within the positioning groove rather than sliding the bumper down the clapper shaft. Rotating the eccentric bumper impedes the swing arc of the clapper.

Lastly, for lower notes, the present invention utilizes a multi-layer construction for the clapper head which, in its preferred embodiment, consists of an insert, encapsulated by a synthetic thermoplastic rubber such as "SANTOPRENE" or "DYNAFLEX" and then covered by an exterior layer of flocked "NYLON". The multi-layer construction of the clapper head optimizes the proper sound generation. Other materials were considered and proved effective for the multi-layer construction, such as thermoset rubber in place of the thermoplastic rubber, but the present embodiment was preferred from a cost and performance viewpoint. The clapper head is donut-shaped and contains a core that is a molded "NYLON" insert that does not extend through the clapper head. The inner diameter of the "NYLON" insert, which faces the hinge assembly, has a circular inner diameter and is in the female form. On the opposite end of the clapper head, synthetic thermoplastic rubber is molded around and on top of the "NYLON" insert. A hole is borne through the thermoplastic rubber to allow the clapper head to be seated on the end of the clapper support shaft with the threaded end of the clapper shaft exposed. The clapper head is designed so that the thermoplastic rubber lines the hole borne through the "NYLON" insert. Thus, the clapper head support shaft is not in direct contact with the "NYLON" insert for its entire length. Optimal sound generation is thereby promoted by eliminating any "slapping" sound which results from the support shaft hitting the "NYLON" insert when the clapper strikes the chime tube. Further, the exterior layer of "NYLON" flocking is advantageous over felt clapper heads because it eliminates nuisance "pinging" sounds due to its softer contact surface.

Other features and advantages of the present invention are disclosed below.

BRIEF DESCRIPTION OF THE DRAWINGS

The above and other objects and advantages of the invention will become more apparent and more readily appreciated from the following detailed description in connection with the attached drawings. For the purpose of illustrating the invention, there is shown in the drawings embodiments that are presently preferred, it being understood, however, that the invention is not limited to the specific embodiments disclosed. In the drawings:

FIG. 3 illustrates an enlarged cross-sectional view of the hinge assembly shown in FIG. 2.

FIG. 4 illustrates a cross-sectional view of the axle and polymer bearing assembly taken at line 4—4 of FIG. 3.

FIG. 5 illustrates a top, cross-sectional view of the hinge assembly taken at line 5—5 of FIG. 4.

DETAILED DESCRIPTION OF PRESENTLY PREFERRED EMBODIMENTS

Figures 1, 8, 9:
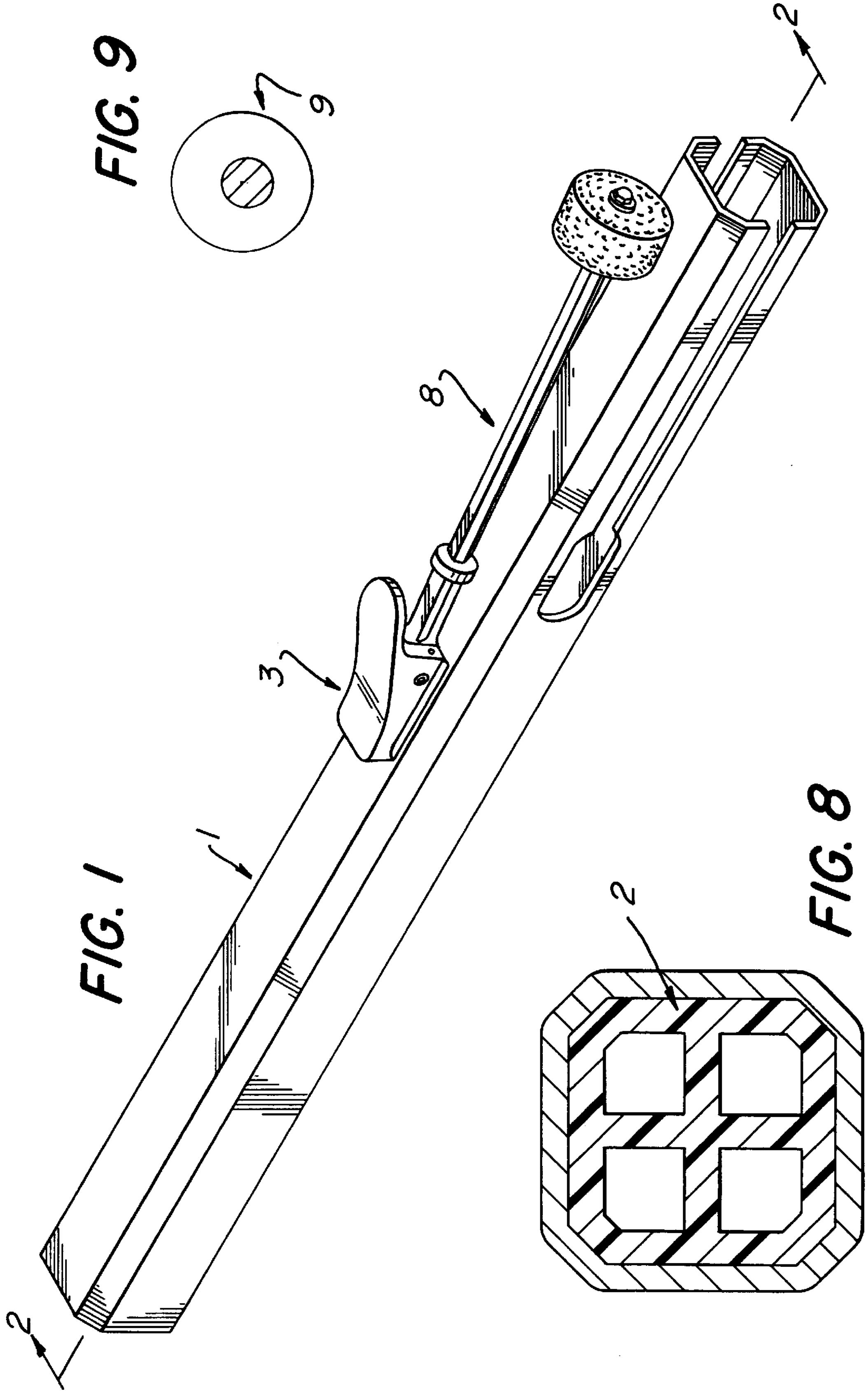
FIG. 1 represents an isometric view of the larger diameter or lower note handchime in accordance with the present invention.
FIG. 8 illustrates a cross-sectional view of the plug taken at line 8—8 of FIG. 2.
FIG. 9 illustrates a cross-sectional view of the eccentric rubber bumper taken at line 9—9 of FIG. 2.

FIG. 1 is an isometric view of the larger diameter handchime. The handchime is constructed from an octagonal-sided, aluminum tube 1. FIG. 1 also shows the clapper head support shaft 8 and hinge 3.

Figure 2:
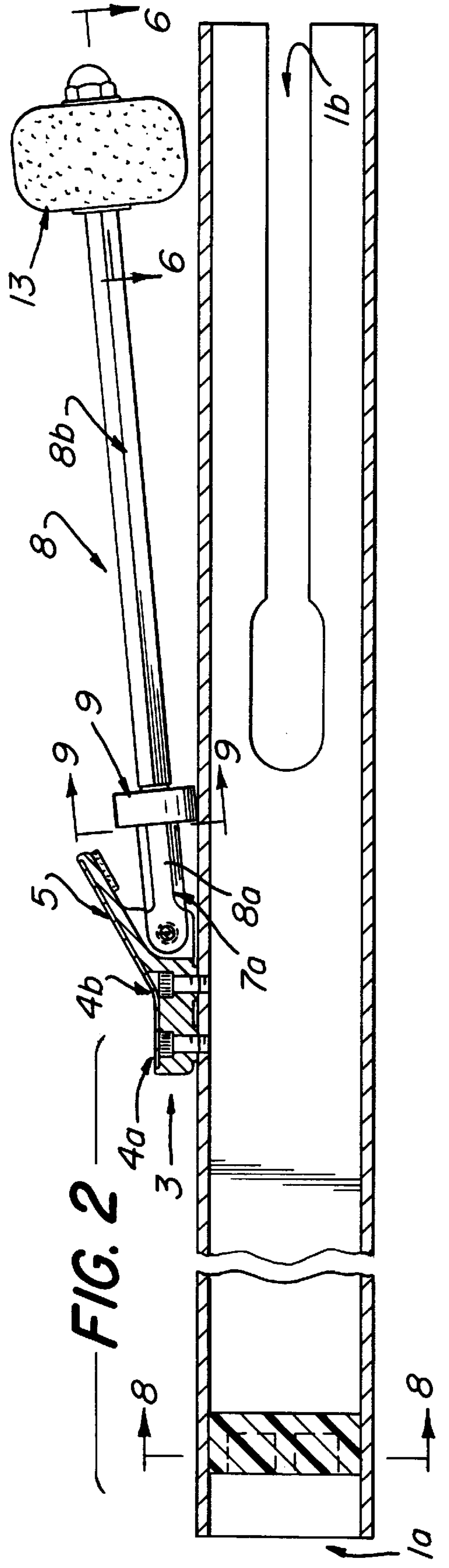
FIG. 2 illustrates a cross-sectional view of the larger diameter handchime taken at a line perpendicular to line 2—2 of FIG. 1.

FIG. 2 is a cross-sectional view of the larger diameter handchime. Tube 1 is partitioned by plug 2 (a cross-section of the "waffled" side of plug 2 is illustrated in FIG. 8) into two compartments: a hollow open end 1*a* and a multi-slotted end 1*b*. The position of plug 2 within tube 1 will vary depending upon the particular note and octave that the chime is intended to emit.

FIG. 3 is an enlarged cross-sectional view of the hinge assembly shown in FIG. 2. The hinge assembly is similar in both the large and small diameter handchimes. Hinge 3, which is made of a polymer such as "ACETAL", is attached to tube 1 through two fasteners, 4*a* and 4*b*. The preferred embodiment discloses the hinge elevated from tube 1, however, the hinge can also be flush mounted. Hinge 3 has a recessed area on its top surface to place a label 5 and felt pad back stop 6. Hinge 3 is also shaped to allow for a thumb rest. Back stop 6 is affixed to hinge 3 to prevent the contact of yoke 7 to hinge 3 and also to limit its swing range. Clapper support shaft 8 is molded into yoke 7. Clapper support shaft 8 can be viewed as being comprised of three different segments: 8*a*, 8*b*, and 8*c*. Segment 8*a* has a circular cross section and is of varying cross section that serves as a positioning groove for eccentric rubber bumper 9. Eccentric rubber bumper 9, which has a circular inner diameter offset from center as illustrated in FIG. 9, is placed at segment 8*a* of support shaft 8. Bumper 9 acts as a damper and allows quick control over volume and response. Segment 8*b* has a hexagonal cross section and constitutes the majority of the length of clapper support shaft 8. Segment 8*c* has a circular cross section and a threaded end at the tip of clapper support shaft 8 where the clapper head is attached.

FIG. 4 is a cross-sectional view which shows the relationship of yoke 7 to hinge 3 taken at sectional line 4—4 of FIG. 3. Yoke 7 can swing freely due to axle 10. Axle 10 joins hinge 3 and yoke 7 via a pair of polymer (such as "NYLINER") bearings 11*a* and 11*b*.

FIG. 5 is a cross-sectional top view taken at sectional line 5—5 of FIG. 4. FIG. 5 shows tensioning screws 12*a* and 12*b* which are perpendicular to axle 10 and can be used by the musician to adjust the strike feel to his or her preference.

Figure 6:
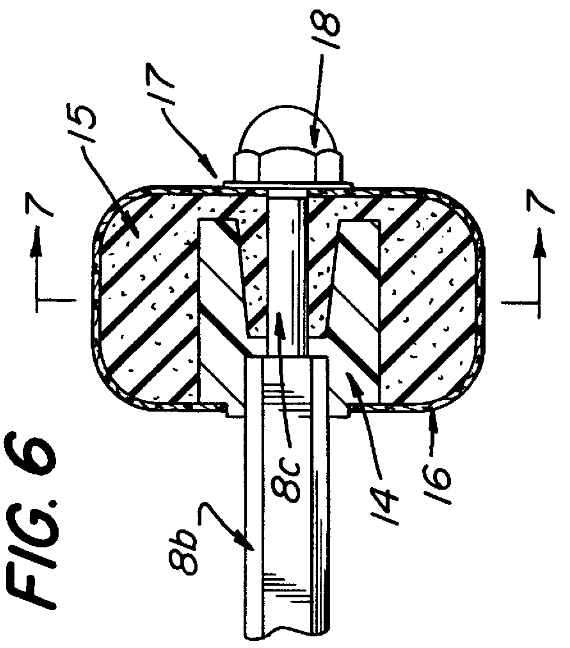
FIG. 6 illustrates an enlarged cross-sectional view of the clapper head for a larger diameter handchime taken at section line 6—6 of FIG. 2.
Figure 7:
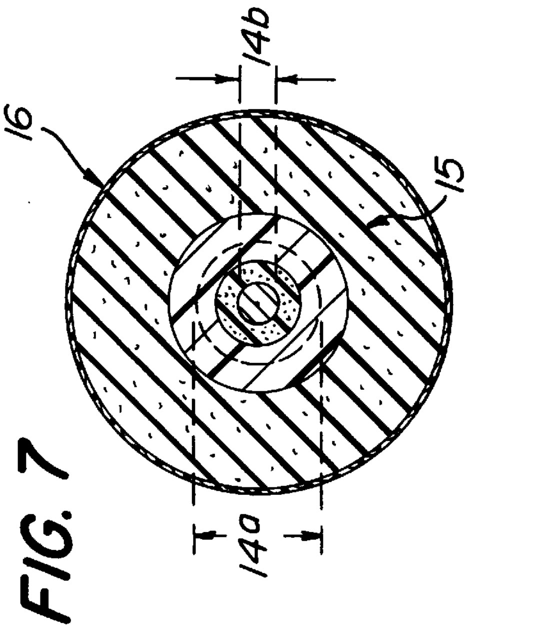
FIG. 7 illustrates a cross-sectional base view of the clapper head for a larger handchime taken at section line 7—7 of FIG. 6.

FIG. 6 shows a detailed, cross-sectional view of the clapper head assembly for larger handchimes taken at sectional line 6—6 of FIG. 2. Clapper head 13 is comprised of a "NYLON" insert core 14, an encapsulating layer of synthetic thermoplastic rubber (such as "SANTOPRENE" or "DYNAFLEX") 15, and an outside covering of flocked nylon 16. The thermoplastic layer is also molded in the inner diameter of insert core 14 so that the 8*c* segment of clapper shaft 8 has direct contact with the thermoplastic rubber layer 15 rather than the "NYLON" insert 14. Contact with layer 15 dampens any "slapping" that may occur. Insert 14 does not extend through clapper head 13 and has a larger inner diameter 14*a* at its base than at its top 14*b*, as illustrated in FIG. 7.

The side of the clapper head 13, facing the hinge assembly, appears in the female form. This allows clapper head 13 to slide over the end of segment 8*b* of clapper support shaft 8. The end of segment 8*b* coincides to the depth of the inner diameter 14*a* of "NYLON" insert 14. Inner diameter 14*b* of clapper head 13 is slid over segment 8*c* or the threaded end of clapper support shaft 8. Segment 8*c* extends out over the end of clapper head 13. After clapper head 13 is placed on the end of the clapper head support shaft 8, positioning washer 17 is then slid over this threaded end. Acorn nut 18 secures washer 17 and clapper head 13 in place.

Figure 10:
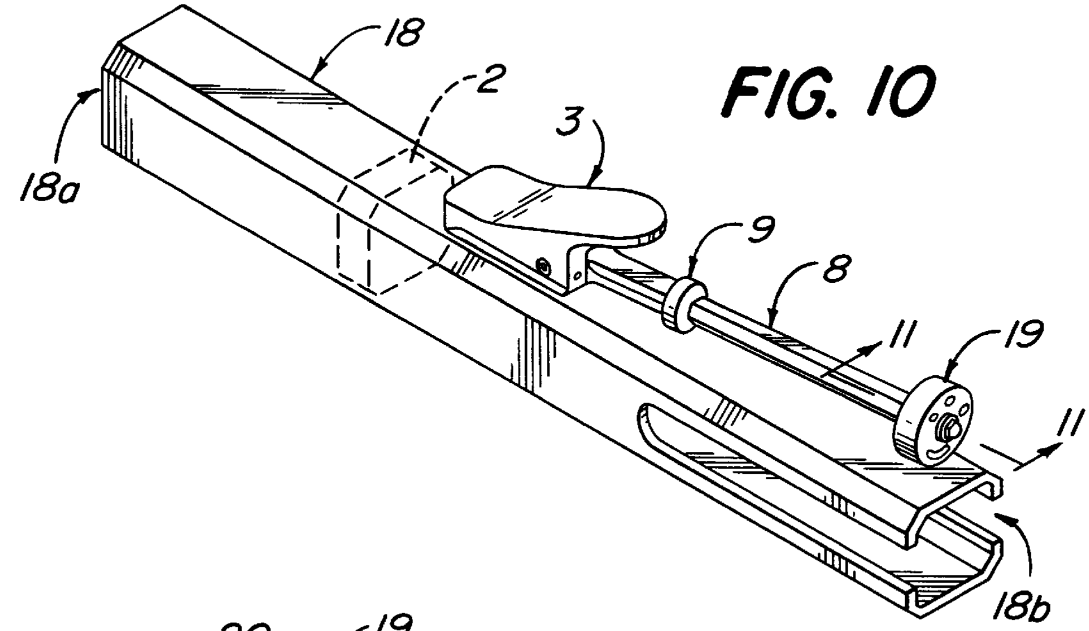
FIG. 10 represents an isometric view of the smaller diameter or middle or higher note handchime in accordance with the present invention.

An alternative embodiment of the described handchime is depicted in FIG. 10. FIG. 10 shows an isometric view of the smaller cross section or middle or higher note handchime. As FIG. 10 illustrates, the smaller cross-section handchime is composed of a hollow, octagonal cross-sectional tube 18 that is partitioned by plug 2 into two compartments: a hollow open end 18*a* and a single-slotted end 18*b*. The hinge assembly and clapper support shaft assemblies are essentially the same for both the larger and smaller diameter embodiments.

Figure 12:
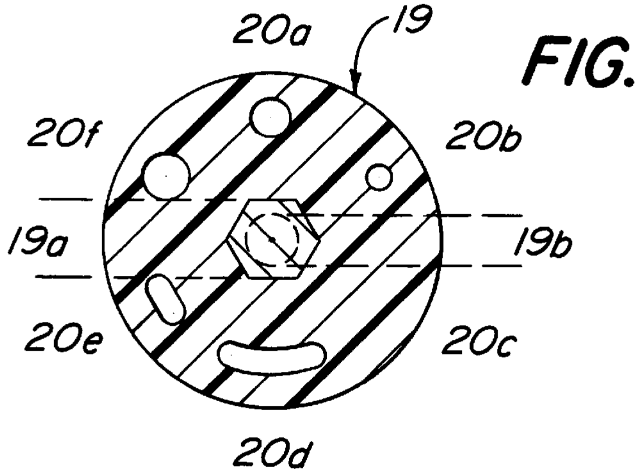
FIG. 12 illustrates a cross-sectional view of the clapper head of the smaller diameter handchime illustrating the various timbre settings taken at line 12—12 of FIG. 11.
Figure 11:
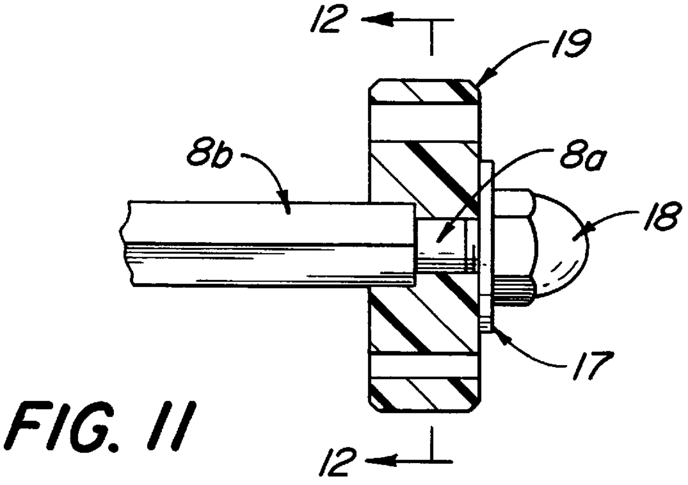
FIG. 11 illustrates an enlarged cross-sectional view of the smaller diameter clapper head taken at line 11—11 of FIG. 10.

FIG. 11 illustrates a cross-sectional view of the thermal plastic rubber clapper head 19 attachment to segment 8*c* of clapper support shaft 8 taken at sectional line 11—11 of FIG. 10. Typical duorometer measurements, or rubber hardness, for clapper head 19 in a 3 octave set are as follows: 40 shore D, 68 shore A or 80 shore A. Duoremeter measurements vary depending upon the desired note and octave that the handchime corresponds to. The side of clapper head 19, which faces the hinge assembly, is in the female form. FIG. 12 shows a cross-sectional view of clapper head 19 taken at sectional line 12—12 of FIG. 11. Clapper head 19 is donut shaped and has two inner dimensions: 19*a* and 19*b*. Inner dimension 19*a*, it made in a female form, is hexagonal shaped, and extends to a depth which is approximately half the thickness of clapper head 19. Because it is in the female form, it allows clapper head 19 to slide over segment 8*b* of clapper support shaft 8. Inner diameter 19*b*, has a circular cross section and smaller inner dimension than 19*a*, which allows clapper head 19 to slide over segment 8*c* of clapper support shaft 8. The threaded end of segment 8*c* extends over the width of clapper head 19. After clapper head 19 is placed on the end of clapper support shaft 8, positioning washer 17 is set in place. Acorn nut 18 secures washer 17 and clapper head 19 in place. FIG. 12 also depicts the multiple strike point positions 20*a* through 20*f* of clapper head 19. Positions 20*a*, 20*b*, and 20*f* are circular-shaped apertures of varying radii. Position 20*c* is blank. Lastly, positions 20*d* and 20*e* are slotted apertures with radial edges but vary in length. The musician can change the strike position of clapper head 19 by removing the acorn nut 18 and washer 17 and repositioning clapper head 19 on clapper support shaft 8.

The instrument is played by holding tube 1 or 18 upright at hollow, open end 1*a* or 18*a* (depending upon the diameter of the tube or the note being played). The musician swings tube 1 or tube 18 down using a short "snap" of the wrist which causes the clapper assembly to swing downwards in a limited arc until clapper head 13 or 19 strikes the slotted end (either 1*b* or 18*b*) emitting the particular note.

Conclusion

In view of the foregoing, it is apparent that the present invention provides novel features that distinguish the invention over the prior art. These novel features are summarized below.

First, in the preferred embodiments, the shape of the main tube offers advantages over the prior art. Preferably, the tube is designed to be constructed from octagonal cross-section aluminum tubing. Other handchimes disclosed in the prior art are constructed of standard square cross-section tubing, similar to that used for table and chair legs. The instant invention is preferable to the square cross-section handchimes because the octagonal cross-section is more comfortable to hold and play. Still other handchimes in the prior art are of square cross-section but have rounded edges or have rounded or "bowed" sides. The octagonal cross-section is optimal ergonomically.

In addition, as described above, the hollow aluminum tube is preferably partitioned by an internal plug. The position of the plug within the tube is selected in accordance with the particular note that the chime is to emit. One compartment or end of the tube is used to hold the instrument. The plug is waffled on the side that faces the holding end. The opposite end, or resonating end, is slotted.

The prior art discloses examples of handchimes (such as U.S. Pat. No. 4,599,932) or musical bells (such as U.S. Pat. No. 991,704) that also include a slotted, resonating end. The slots in both of these patents are of one size. For lower notes, single-sized slot configurations may encourage the production of a "buzzing" sound due to the generation of extraneous resonant frequencies being generated by the combination of the width and length of the slot. The present invention, by contrast, eliminates or discourages "buzzing" by adopting a multi-sized slot configuration. The multi-sized slot "tunes out" the extraneous frequencies and eliminates the "buzzing."

The prior art also discloses numerous means to attach the clapper to the main body of the instrument. Some patents disclose the use of an elastomeric hinge while others disclose the use of a rivet. Although the prior art discloses some examples that use metal plates and pins to attach the striking member to the main body of instrument, few of these provide the advantages that the present invention offers. The present invention incorporates a hinge assembly that features a combination of a stainless steel axle set in a pair of polymer bearings (i.e., "NYLINER") and made adjustable via concealed tensioning screws. The axle and polymer bearings seldom need lubrication. This combination provides accurate, secure alignment of the shaft assembly and eliminates any looseness or "play" in the instrument. The threaded holes for the tensioning screws allow tight-fitting thread engagement so that the use of a thread bonding adhesive, such as "LOC-TITE" adhesive to impede the movement of the threads during normal use, is eliminated. In addition, the tensioning screws allow the musician to adjust the tensioning on the axle and bearings to set the strike "feel" to his or her preference. The musician can simply adjust the tensioning screws to decrease or increase the tension. Less wear is inflicted on the bearings with no loss of durability or longevity of the instrument. Thus, the combination of these features minimizes maintenance and wear of the instrument.

An additional advantage of the present invention is seen in the shaft that supports the clapper head. The clapper support shaft is molded into its yoke rather than pinned in place. The shaft is of sufficient weight to eliminate the need for additional weIght at the end of the clapper head to obtain the proper impact force. The shaft length for each note is then individually sized to strike the tube at the optimum strike point.

For middle or high notes or smaller diameter chimes, the hexagonal cross-section segment of the clapper support shaft also allows for flexible voicing. For these notes, the clapper head has six different timbre settings. The simple assembly of the clapper head to the support shaft allows the musician to reposition the clapper head to a different timbre setting. The preferred embodiment of the invention discloses five different shaped openings of varying radii plus one blank area to allow the musician to adjust the timbre. Because the timbre settings correspond to each side of the hexagonal cross-section of the support shaft, the musician can easily and precisely set the clapper head to a particular timbre setting.

The prior art discloses many instruments that provide a flexible or sliding rubber bumper as a damping means. The present invention, in its preferred embodiments, differs from the prior art by incorporating a positioning groove on the clapper support shaft to hold the eccentric rubber bumper relatively fixed in place along the shaft's longitudinal axis. The groove is located on the support shaft at the opposite end of the clapper head. The positioning groove holds the rubber bumper securely in place longitudinally. The convenient location of the eccentric rubber bumper, at the base of the clapper shaft, allows the musician to achieve damping by simply rotating the eccentric rubber bumper within the positioning groove rather than sliding the bumper down the clapper shaft. Rotating the eccentric bumper impedes the swing arc of the clapper.

Another advantageous aspect of the preferred embodiments lies in the utilization of a multi-layer construction for the clapper head that includes an insert, encapsulated by a thermoplastic rubber and then covered by an exterior layer of flocked "NYLON." This multi-layer construction of the clapper head optimizes the proper sound generation. The clapper head is donut-shaped and contains a core that is a molded "NYLON" insert that does not extend through the clapper head. The inner diameter of the "NYLON" insert is larger at the base than at the top. The thermoplastic rubber is molded around and on top of the "NYLON" insert on the end that faces an acorn fastener. A hole is borne through the thermoplastic rubber to allow the clapper head to be seated on the end of the clapper support shaft with the threaded end of the clapper shaft exposed. The clapper head is designed to allow the thermoplastic rubber to line the hole borne through the "NYLON" insert. Thus, the clapper head support shaft is not in direct contact with the "NYLON" insert for its entire length. Optimal sound generation is thereby promoted by eliminating any "slapping" sound which results from the support shaft hitting the "NYLON" insert when the clapper strikes the chime tube. Further, the exterior layer of "NYLON" flocking is advantageous over felt clapper heads disclosed in the prior art because it eliminates nuisance "pinging" sounds due to its softer contact surface.

The presently preferred embodiment for a typical large cross section handchime, such as note D4, consists of an octagonal cross-section aluminum tube, which has a cross-section that is 1½ inches wide by 1½ inches high and a length of 18 inches. The plug is inserted ⅝ inches in from the holding end of the tube. The resonating end has a multi-sized slot that can be viewed as having two segments. The first segment, which opens to the resonating end, has a length of 4 5/16 inches and a width of ⅜ inch. The other segment, which is closest to the hinge assembly, has a length of 1 7/16 inches and a width of 11/16 inches. The second slot segment also has radial-shaped edges. The length of the clapper support shaft, which extends from the eccentric bumper to the clapper head, is 5⅛ inches. The multi-layer clapper head has a diameter of 1⅜ inches and a height of ⅞ inches. The eccentric rubber bumper, which is located at the base of the support shaft, has a diameter of 11/16 inches and a height of ¼ inch.

The presently preferred embodiment of the small diameter handchime for note F♯5/G♭5 consists of an octagonal aluminum tube, which has a cross-section that is 1¼ inches wide by 1¼ inches high and a length of 10¾ inches. The plug is inserted 3 inches in from the holding end of the tube. The resonating end has a single-sized slot, which has a length of 3 9/16 inches and a width of ½ inch. The slot segment has radial-shaped edges.

The length of the clapper support shaft, which extends from the eccentric bumper to the clapper head, is 6 inches. The multiple timbre setting clapper head has a diameter of 1 inch and a height of 5/16 inches. The eccentric rubber bumper, which is located at the base of the support shaft, has a diameter of 11/16 inches and a height of ¼ inch. It is important to note that the dimensions for the above handchimes are nominal and will vary from chime to chime as the chime is tuned.

Finally, although the present invention has been described with reference to two exemplary embodiments, it will be understood by those skilled in the art that the invention is not limited to the embodiments specifically disclosed herein. Those skilled in the art also will appreciate that many other variations of the specific embodiments described herein are intended to be within the scope of the invention as defined by the following claims.

We claim:

1. A handchime, comprising:

a main tube having a slotted end and an end for holding, said ends being internally partitioned by a plug;

a hinge affixed to the main tube that accommodates a yoke, which is joined to the hinge via an axle, adjustable tensioning member and bearings that allow the yoke to swing in a limited arc, said yoke containing a clapper support shaft; and a clapper head attached to the end of the clapper support shaft.

2. The handchime of claim 1 wherein the slotted end comprises a slot having two or more slot segments of different sizes.

3. The handchime of claim 1 wherein the slotted end comprises a slot of uniform size.

4. The handchime of claim 1 wherein the axle is stainless steel.

5. The handchime of claim 1 wherein the bearings are composed of a polymer material.

6. The handchime of claim 1 further comprising screws to adjust the tension on the axle and bearings.

7. The handchime of claim 1 wherein the clapper support shaft is of hexagonal cross section.

8. The handchime of claim 1 wherein the weight of the clapper support shaft is sufficient to provide proper impact force.

9. The handchime of claim 1 further comprising damping means of an eccentric shape mounted on said clapper support shaft.

10. The handchime of claim 1 wherein the clapper support shaft contains a groove to accommodate the damping means.

11. The handchime of claim 1 wherein the clapper head for middle or higher notes provides a plurality of timbre settings.

12. The handchime of claim 1 for lower notes wherein the clapper head is constructed of multiple layers of material.

13. The handchime of claim 1 wherein the main tube is comprised of aluminum.

14. The handchime of claim 1 wherein the main tube is of octagonal cross section.

15. The handchime of claim 1 wherein the hinge is comprised of polymer.

16. The handchime of claim 1 wherein said hinge is shaped to accommodate a thumb rest.

17. The handchime of claim 1 wherein said plug has at least one "waffled" surface.

18. The handchime of claim 1 wherein said main tube has an octagonal cross-section and is comprised of aluminum, said plug has at least one "waffled" surface, said slotted end of said main tube has at least two slot segments of different sizes, said hinge is comprised of polymer and is shaped to provide a thumb rest, said clapper support shaft has a hexagonal cross-section, a weight that provides proper impact force, and is grooved to accommodate a damping means which is eccentric shaped, said hinge assembly is comprised of a stainless steel axle, polymer bearings, and adjustable tensioning screws, and said clapper head is comprised of multiple layers of material.

19. The handchime of claim 1 wherein said main tube has an octagonal cross-section and is comprised of aluminum, said plug has at least one "waffled" surface, said slotted end of said main tube has a uniform size, said hinge is comprised of polymer and is shaped to provide a thumb rest, said clapper support shaft has a hexagonal cross-section, a weight that provides proper impact force, and is grooved to accommodate a damping means which is eccentric shaped, said hinge assembly is comprised of a stainless steel axle, polymer bearings, and adjustable tensioning screws, and said clapper head provides a plurality of timbre settings.

20. A handchime for lower notes, comprising:

a main tube having two ends, including an open end for grasping as a handle and a multi-sized, slotted end for resonating musical tones;

a hinge attached to the main tube that contains a yoke and a mounted clapper support shaft within said yoke and is joined to the hinge via a combination of axle, bearings, and tensioning screws; and a clapper head comprising multiple layers of material mounted on the end of a support shaft.

21. The handchime of claim 20 wherein the main tube is of octagonal cross section.

22. The handchime of claim 20 wherein the diameter of said main tube is greater than or equal to 1 and ½ inches.

23. The handchime of claim 20 wherein said main tube is comprised of aluminum.

24. The handchime of claim 20 wherein said hinge is comprised of polymer.

25. The handchime of claim 20 wherein said main tube is comprised of aluminum, has an octagonal cross-section, and has a diameter greater than or equal to 1 and ½ inches, and said hinge is comprised of polymer.

26. A handchime for middle or higher notes, comprising:

a main tube having two ends: an open end for grasping as a handle and a slotted end of uniform size for resonating musical tones;

a hinge attached to the main tube that contains a yoke and a mounted clapper support shaft within said yoke and is joined to the hinge via a combination of axle, bearings, and tensioning screws; and a clapper comprising an adjustable, rubber clapper head mounted on the end of a support shaft.

27. The handchime of claim 26 wherein the main tube is of octagonal cross section.

28. The handchime of claim 26 wherein the diameter of said main tube is less than 1 and ½ inches.

29. The handchime of claim 26 wherein the clapper head contains a plurality of settings to adjust timbre.

30. The handchime of claim 26 wherein said main tube is comprised of aluminum.

31. The handchime of claim 26 wherein said hinge is comprised of polymer.

32. The handchime of claim 26 wherein said main tube is comprised of aluminum, has an octagonal cross-section, and has a diameter less than 1 and ½ inches, said hinge is comprised of polymer, and said clapper head contains a plurality of settings to adjust timbre.

* * * * *

US005986194C1

(12) REEXAMINATION CERTIFICATE (4680th)

United States Patent

(10) Number: US 5,986,194 C1
(45) Certificate Issued: Dec. 10, 2002

Schwartz et al.

(54) HANDCHIME INSTRUMENT

(75) Inventors: Gregory L. Schwartz, Spinnerstown, PA (US); Richard E. Mattern, Souderton, PA (US); Russell A. Wenner, Perkiomenville, PA (US)

(73) Assignee: Schulmerich Carillons, Inc., Sellersville, PA (US)

Reexamination Request:
No. 90/005,788, Aug. 10, 2000

Reexamination Certificate for:
Patent No.: 5,986,194
Issued: Nov. 16, 1999
Appl. No.: 09/184,664
Filed: Nov. 2, 1998 09/184,664

(51) Int. Cl.[7] .......... G10D 13/08
(52) U.S. Cl. .......... 84/404; 84/402
(58) Field of Search .......... 84/404, 406, 402, 84/408, 422.1, 422.4, 417; 446/418, 421, 426; D17/22

(56) References Cited

U.S. PATENT DOCUMENTS

| | | | | |
|---|---|---|---|---|
| 3,581,130 A | * | 5/1971 | Grib | 310/25 |
| 3,760,482 A | * | 9/1973 | Kawamura | 29/896.22 |
| 4,121,534 A | | 10/1978 | Malta | 116/171 |
| 4,520,710 A | * | 6/1985 | Elliott, Jr. | 84/422.1 |
| 4,566,400 A | | 1/1986 | Keenan et al. | 116/171 |
| 4,599,932 A | * | 7/1986 | Malta | 84/404 |
| 4,649,792 A | * | 3/1987 | Swartzlander | 84/422.4 |
| 5,001,339 A | * | 3/1991 | Starkey et al. | 250/229 |
| 5,212,331 A | * | 5/1993 | Waldo | 84/404 |
| 5,505,114 A | * | 4/1996 | Lawson | 84/404 |
| 5,565,638 A | * | 10/1996 | Liao | 84/422.1 |
| 5,905,218 A | * | 5/1999 | Chang | 84/422.1 |
| 5,929,356 A | * | 7/1999 | Piland et al. | 84/422.4 |
| 6,005,177 A | | 12/1999 | Malta | 84/404 |

OTHER PUBLICATIONS

Suzuki Musical Instruments by Suzuki Coporation; 1987 Catalog; Front cover, pp. 9 and 10, and rear cover.

Suzuki Tonechimes Handling Isntructions by Suzuki Corporation; (undated); one page.

Choirchime Instructions by Malmark, Inc.; Apr. 2, 1991; all pages.

Instructions for Choichime Instruments by Malmark, Inc.; Nov. 16, 1992; all pages.

"Guide to the American Made Schulmerich Handbells," *Handbell Care & Maintenance Write–up* prior to Oct. 1994, 46–476–REV. C, pp. 1–12.

"Guide to the American Made Schulmerich Handbells," *Schulmerich™ Handbells Care & Maintenance Manual*, Aug. 1995, 46–476–REV. D, 21 pages.

"The Schulmerich Handbells: A Legacy of Quality—Anatomy of the Schulmerich Handbell," *Schulmerich Handbells,* Jun. 1995, 1 page.

"Get Started on Something Great," *Melody Chime™*, Apr. 1998, 4 pages.

"Get Started on Something Great. (We Sure Did!)," Bell Notes, *Melody Chime™*, Apr. 1998, pp. 1–4.

"Reverberations," *J. Handbell Ringers of Great Britain,* 1990, 23(1), ISSN 0263–452X, pp. 1, 53.

"Reverberations," *J. Handbell Ringers of Great Britain,* Oct. 7, 1967, Registered Charity No.: 29845, ISSN 0263–452X, pp. 65, 90–92.

* cited by examiner

*Primary Examiner*—Shih-yung Hsieh

(57) ABSTRACT

A hand held musical instrument is capable of emitting sound through the combination of three elements: a hollow tube, a striking member, and a hinge to secure the striking member to the tube. The hollow tube is constructed of an ergonomic shape that allows easy and fatigue-free grasping. For low notes, the slots on the resonating end of the hollow tube are multi-sized to eliminate buzzing. The clapper is attached to the hollow tube through a combination of a stainless steel axle, polymer bearings and adjustable tensioning screws. This combination improves the durability of the instrument yet still allows the musician to adjust the strike feel. The invention also provides improvements in the clapper heads for both low note and middle and high note handchimes. For low notes, the clapper head is constructed of multiple layers that optimize sound quality. For middle or high notes, the rubber clapper head provides multiple settings which allows the musician to easily and precisely adjust the timbre setting.

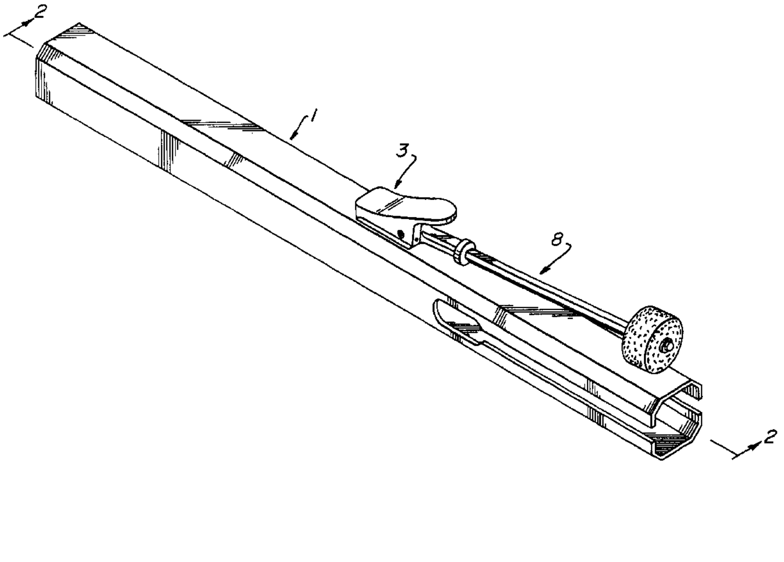

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

ONLY THOSE PARAGRAPHS OF THE SPECIFICATION AFFECTED BY AMENDMENT ARE PRINTED HEREIN.

Column 5, lines 18–22:

FIG. 4 is a cross-sectional view which shows the relationship of yoke 7 to hinge 3 taken at sectional line 4—4 of FIG. 3. Yoke 7 can swing freely due to axle 10. *In certain preferred embodiments of the present invention, axle 10 is unitary.* Axle 10 joins hinge 3 and yoke 7 via a pair of polymer (such as the "NYLINER") bearings 11a and 11b.

Column 5, lines 23–27:

FIG. 5 is a cross-sectional top view taken at sectional line 5—5 of FIG. 4. FIG. 5 shows tensioning screws 12a and 12b which are perpendiculer to axle 10 and can be used by the musician to adjust the strike feel to his or her preference. *In the embodiment depicted in FIG. 4 and FIG. 5, bearings 11a and 11b are independent from tensioning screws 12a and 12b which act directly upon bearings 11a and 11b.*

AS A RESULT OF REEXAMINATION, IT HAS BEEN DETERMINED THAT:

Claims 2, 3 and 26–32 are cancelled.

Claims 1, 18 and 20 are determined to be patentable as amended.

Claims 4–17, 19 and 21–25 dependent on an amended claim, are determined to be patentable.

New claims 33–40 are added amd determined to be patentable.

1. A handchime, comprising:

a main tube having a slotted end and an end for holding, said ends being internally partitioned by a plug *wherein said slotted end has two or more segments of different sizes, each of said segments has a length and a width wherein said length is greater than said width and wherein each segment has sides, said sides being generally equidistant from the center of said segment, without any interposing structure*;

a hinge affixed to the main tube that accommodates a yoke, which is joined to the hinge via an axle, adjustable tensioning member and bearings that allow the yoke to swing in a limited arc, said yoke containing a clapper support shaft; and a clapper head attached to the end of the clapper support shaft.

18. The handchime of claim 1 wherein said main tube has an octagonal cross-section and is comprised of aluminum, said plug has at least one "waffled" surface, [said slotted end of said main tube has at least two slot segments of different sizes,] said hinge is comprised of polymer and is shaped to provide a thumb rest, said clapper support shaft has a hexagonal cross-section, a weight that provides proper impact force, and is grooved to accommodate a damping means which is eccentric shaped, said hinge assembly is comprised of a stainless steel axle, polymer bearings, and adjustable tensioning screws, and said clapper head is comprised of multiple layers of material.

20. A handchime for lower notes, comprising:

a main tube having two ends, including an open end for grasping as a handle and a multi-sized, slot for resonating musical tones *wherein said slot includes segments of different sizes, each of said segments has a length and a width wherein said length is greater than said width and wherein each segment has sides, said sides being generally equidistant from the center of said segment, without any interposing structures*;

a hinge attached to the main tube that contains a yoke and a mounted clapper support shaft within said yoke and is joined to the hinge via a combination of axle, bearings, and tensioning screws; and a clapper head comprising multiple layers of material mounted on the end of a support shaft.

*33. A handchime for lower notes, comprising:*

*a main tube having two ends, including an open end for grasping as a handle and a multi-sized slot for resonating musical tones wherein said slot includes segments of different sizes, each of said segments has a length and a width wherein said length is greater than said width and wherein each segment has sides, said sides being generally equidistant from the center of said segment, without any interposing structures;*

*a hinge attached to the main tube that contains a yoke and a mounted clapper support shaft within said yoke and is joined to the hinge via a combination of a unitary axle, bearings, and tensioning screws; and*

*a clapper head comprising multiple layers of material mounted on the end of a support shaft.*

*34. A handchime for lower notes, comprising:*

*a main tube having two ends, including an open end for grasping as a handle and a multi-sized slot for resonating musical tones wherein said slot includes segments of different sizes, each of said segments has a length and a width wherein said length is greater than said width and wherein each segment has sides, said sides being generally equidistant from the center of said segment, without any interposing structures;*

*a hinge attached to the main tube that contains a yoke and a mounted clapper support shaft within said yoke and is joined to the hinge via a combination of axle, bearings, and tensioning screws wherein the tensioning screws act directly upon the bearings; and*

*a clapper head comprising multiple layers of material mounted on the end of a support shaft.*

*35. A handchime for lower notes, comprising:*

*a main tube having two ends, including an open end for grasping as a handle and a multi-sized slot for resonating musical tones wherein said slot includes segments of different sizes, each of said segments has a length and a width wherein said length is greater than said width and wherein each segment has sides, said sides being generally equidistant from the center of said segment, without any interposing structures;*

*a hinge attached to the main tube that contains a yoke and a mounted clapper support shaft within said yoke and is joined to the hinge via a combination of axle, bearings, and tensioning screws; and*

*a multi-layer clapper head comprising an insert and a thermoplastic material substantially encapsulating said insert mounted on the end of a support shaft.*

*36. A handchime, comprising:*

*a main tube having a slotted end and an end for holding, said ends being internally partitioned by a plug;*

*a hinge affixed to the main tube that accommodates a yoke, which is joined to the hinge via a unitary axle, adjustable tensioning member and bearings that allow the yoke to swing in a limited arc, said yoke containing a clapper support shaft; and*

*a clapper head attached to the end of the clapper support shaft.*

*37. A handchime for lower notes, comprising:*

*a main tube having two ends, including an open end for grasping as a handle and a multi-sized, slot for resonating musical tones;*

*a hinge attached to the main tube that contains a yoke and a mounted clapper support shaft within said yoke and is joined to the hinge via a combination of a unitary axle, bearings, and tensioning screws; and*

*a clapper head comprising multiple layers of material mounted on the end of a support shaft.*

*38. A handchime for middle or higher notes, comprising:*

*a main tube having two ends: an open end for grasping as a handle and a slotted end of uniform size for resonating musical tones;*

*a hinge attached to the main tube that contains a yoke and a mounted clapper support shaft within said yoke and is joined to the hinge via a combination of a unitary axle, bearings, and tensioning screws; and*

*a clapper comprising an adjustable, rubber clapper head mounted on the end of a support shaft.*

*39. A handchime, comprising:*

*a main tube having a slotted end and an end for holding, said ends being internally partitioned by a plug;*

*a hinge affixed to the main tube that accommodates a yoke, which is joined to the hinge via an axle, adjustable tensioning member that acts directly upon the axle, and bearings that allow the yoke to swing in a limited arc, said yoke containing a clapper support shaft; and*

*a clapper head attached to the end of the clapper support shaft.*

*40. A handchime, comprising:*

*a main tube having a slotted end and an end for holding, said ends being internally partitioned by a plug;*

*a hinge affixed to the main tube that accommodates a yoke, which is joined to the hinge via an axle, adjustable tensioning member and bearings that allow the yoke to swing in a limited arc, said yoke containing a clapper support shaft; and*

*a clapper head attached to the end of the clapper support shaft.*

* * * * *